April 21, 1925.  
E. L. PEET ET AL  
AGRICULTURAL IMPLEMENT  
Filed March 24, 1922  
1,534,659
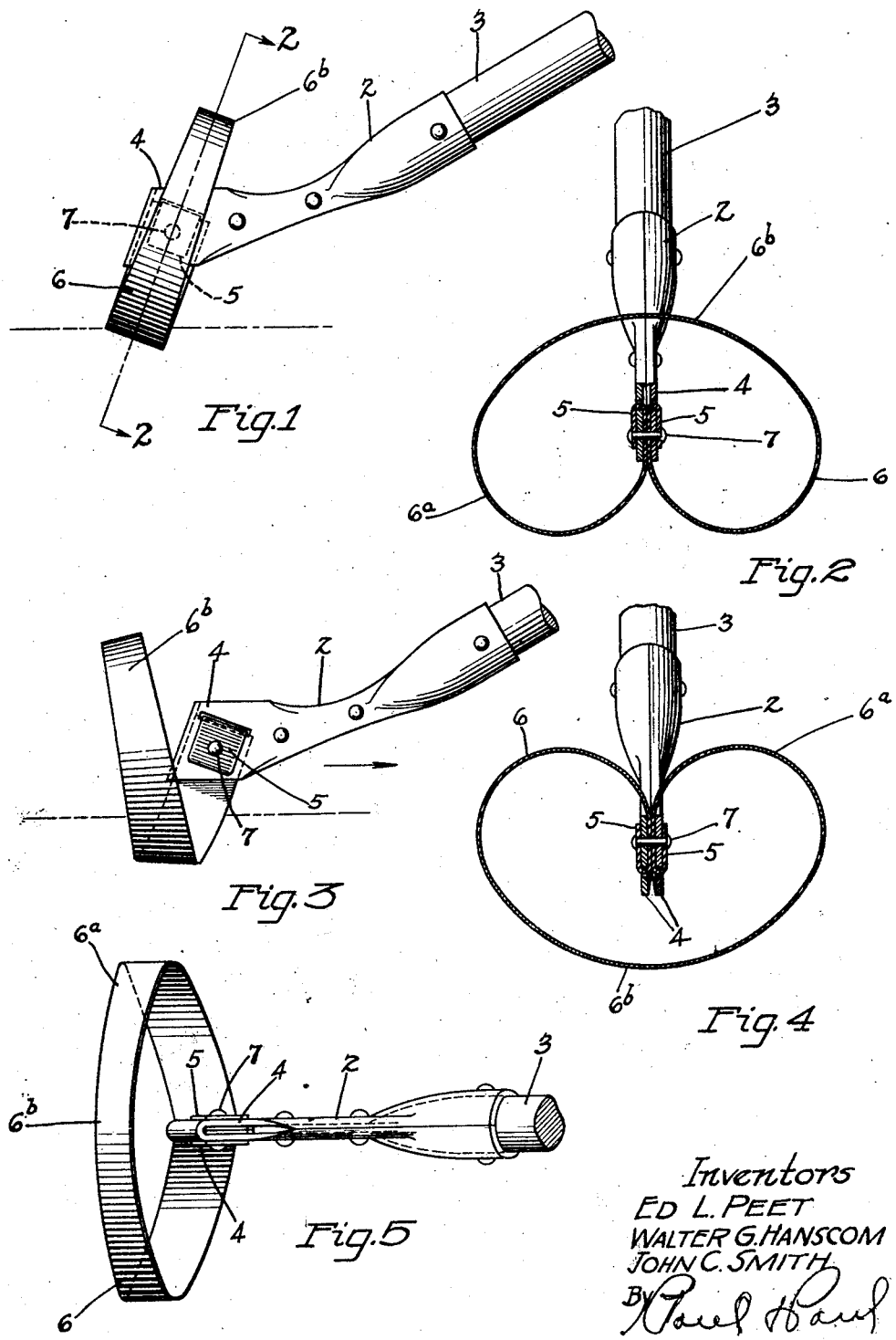
Inventors
ED L. PEET
WALTER G. HANSCOM
JOHN C. SMITH
ATTORNEYS Patented Apr. 21, 1925.

1,534,659

UNITED STATES PATENT OFFICE.

ED L. PEET AND WALTER G. HANSCOM, OF MINNEAPOLIS, AND JOHN CULLIMORE SMITH, OF ST. PAUL, MINNESOTA.

AGRICULTURAL IMPLEMENT.

Application filed March 24, 1922. Serial No. 546,450.

*To all whom it may concern:*

Be it known that we, ED L. PEET and WALTER G. HANSCOM, citizens of the United States, residents of Minneapolis, county of Hennepin, State of Minnesota, and JOHN C. SMITH, a citizen of the United States, and resident of St. Paul, county of Ramsey, State of Minnesota, have invented certain new and useful Improvements in Agricultural Implements, of which the following is a specification.

The object of our invention is to provide an implement or tool designed particularly for pulling or dragging through the soil and cutting the roots and stalks of grass, weeds, and the like, which may be growing between the rows of plants or in or around the hills.

A further object is to provide a device adapted for use in hand or power operated machines, as desired, the function and operation of the cutting blades being substantially the same in both cases.

The invention consists generally in various constructions and combinations, all as hereinafter described and particularly pointed out in the claims.

In the accompanying drawings forming part of this specification,

Figure 1 is a side view of an implement embodying our invention, ready for use,

Figure 2 is a sectional view on the line 2—2 of Figure 1,

Figure 3 is a view corresponding to Figure 1 when power has been applied to the handle to drag the cutting blade through the soil, Figure 4 is a view corresponding to Figure 2, showing the blade in another position, Figure 5 is a plan view of the tool.

In the drawing, 2 represents the shank of the tool, having a hand grip 3 mounted therein. The end of the shank is provided with jaws 4 and between these jaws we place the ends 5 of a flat blade, made preferably of spring material, and bent to form loops 6 and 6ª connected by the middle portion of the band 6ᵇ. The ends 5 are preferably folded around the upper edges of the jaws 4, after being inserted between them, and are then secured together and to the jaws by suitable means, such as a rivet 7. The blade preferably varies in width, as indicated plainly in Figures 1, 3 and 5, and is made sufficiently flexible so that when the loops 6 and 6ª are applied to the soil and a pulling strain exerted thereon, the band will assume the position indicated in Figure 3, with the forward or cutting edges of the loops inclined or oblique to the direction of movement of the tool, thereby providing a shearing cut and severing the roots and stalks of the grass and weeds. There will also be a vibration in this band as it is pulled through the soil, allowing it to adjust itself to inequalities and obstructions and insuring the complete destruction of weed roots and stalks that may be encountered.

The upwardly turned walls of the band during the movement of the tool through the soil will serve as a guide or mold-board for the soil, directing it backwardly and to one side. Whenever desired, the tool may be inverted, assuming a different form, as indicated in Figure 4, where a single loop is provided to pass through the soil instead of the double loops, as shown in Figure 2. In either case, the band will be slightly twisted or distorted by the pressure thereon so that the cutting edges will be diagonal or oblique to the work and thereby severing of the stalks and roots will be assured with comparatively little exertion on the part of the user of the tool.

The band, of course, may be made in various widths and thickness of gauge, according to the diameter or spring of vibration desired.

While we have shown this tool connected with a hand grip, it will be understood that it may be used with a plurality of other bands or mounted in a suitable supporting frame and operated either by hand or by power, as preferred. It will, therefore, be understood that the element mounted in the shank of the tool may be a connection to a power machine, as well as adapted for a hand grip.

We claim as our invention:

1. A device of the class described comprising a shank, a metallic band of spring material mounted in said shank and forming loops having cutting edges to enter the soil, said loops yielding under pull thereon.

2. A device of the class described comprising a shank, a metallic band of flat spring material having its ends mounted in said shank, and loops formed by said ends on each side of said shank, said loops having cutting edges for entering the soil and pull on said shank causing said cutting edges to assume an oblique shearing position.

In witness whereof, we have hereunto set our hands this 14″ day of March, 1922.

ED L. PEET.
WALTER G. HANSCOM.
JOHN CULLIMORE SMITH.